United States Patent [19]

Hand

[11] Patent Number: 5,275,121
[45] Date of Patent: Jan. 4, 1994

[54] MOLDED STRAP CHANNEL

[75] Inventor: John E. Hand, Easley, S.C.

[73] Assignee: Perception, Inc., Easley, S.C.

[21] Appl. No.: 703,907

[22] Filed: May 22, 1991

[51] Int. Cl.⁵ .............................................. B63B 5/24
[52] U.S. Cl. .................... 114/347; 114/357; 264/225; 249/142
[58] Field of Search ............ 114/347, 357; 264/225, 264/318; 249/142; 425/429

[56] References Cited

U.S. PATENT DOCUMENTS

| | | | |
|---|---|---|---|
| 848,480 | 3/1907 | Myers | 249/142 |
| 2,463,132 | 3/1949 | Williams | 249/142 |
| 4,196,884 | 4/1980 | Zeman | 264/318 |
| 4,980,112 | 12/1990 | Masters | 264/225 |

FOREIGN PATENT DOCUMENTS 1075204 7/1967 United Kingdom ................ 114/357

OTHER PUBLICATIONS

Plastic Engineering Handbook, Reinhold Publishing Corp., New York, 1960, pp. 297 and 298.

Primary Examiner—Michael S. Huppert
Assistant Examiner—Thomas J. Brahan
Attorney, Agent, or Firm—Cort Flint

[57] ABSTRACT

A molded strap channel and method are disclosed for a kayak and the like or article molded from a flexible skin using a rotational molding process. The strap channel includes a continuous channel having an arcuate shape and a continuous taper from a first channel opening to a second channel opening. First and second channel openings open in a common surface of the flexible skin of the hull and lie generally in a common plane. In accordance with the method, a rotational molding process is disclosed wherein plastic material in a split mold is subjected to a rotational molding process which forms a thin, plastic hull and a continuous strap channel molded about a forming member attached to one-half of the mold. The forming member is unattached from the mold, and the hull is removed from the mold whereby the forming member is tapped and removed from the strap channel so that a continuous strap channel is molded as one-piece with the hull having first and second channel openings as described above.

14 Claims, 2 Drawing Sheets

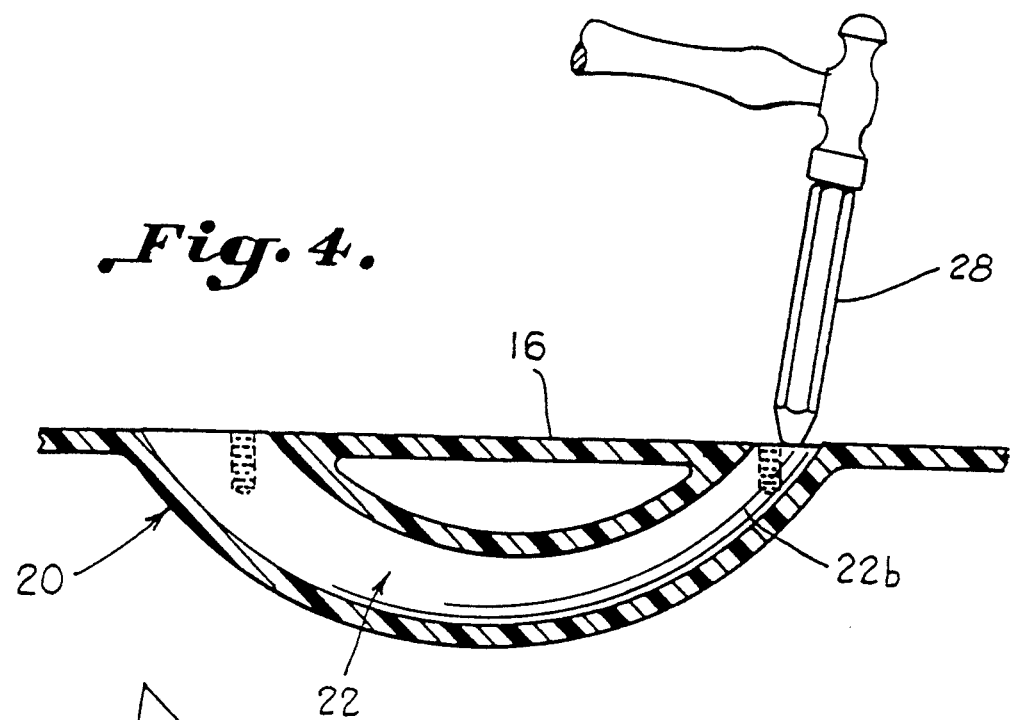
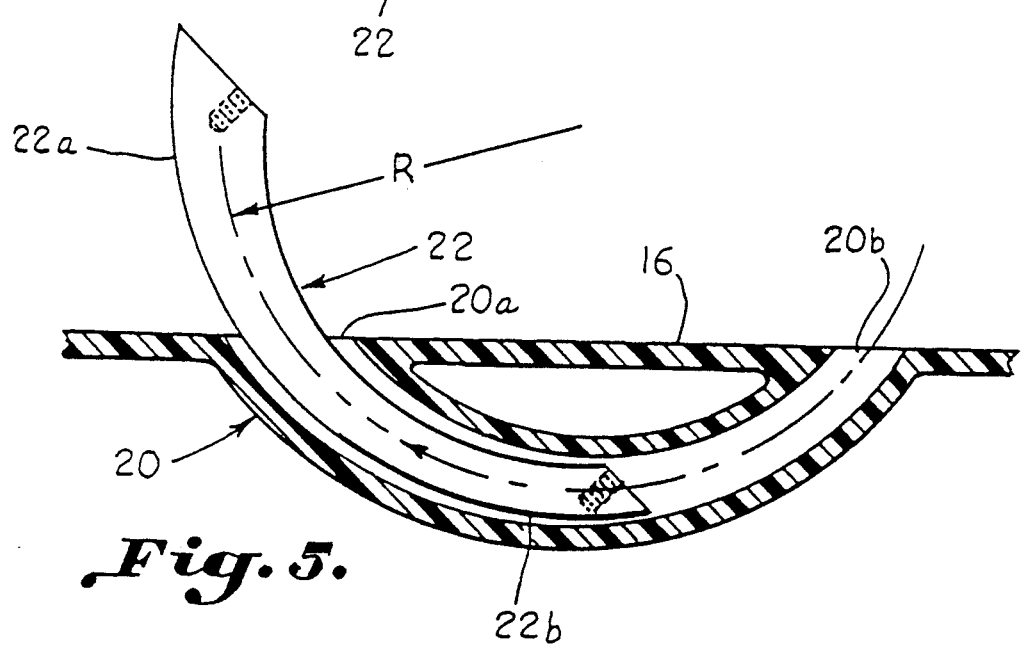
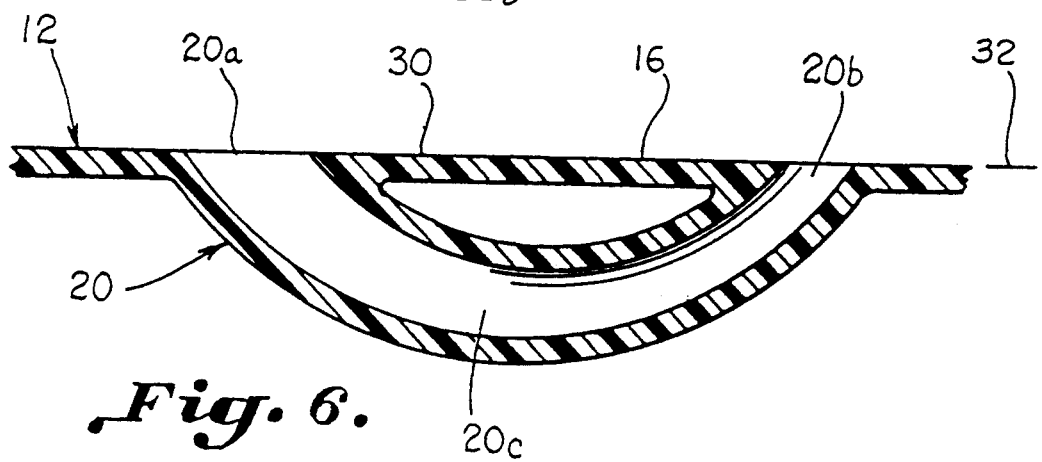

MOLDED STRAP CHANNEL

BACKGROUND OF THE INVENTION

The invention relates to a molded strap channel and method for molding the same which includes a rotational molding process such as used in the molding of flexible skin kayaks and the like.

The sport of white water boating and kayaking has become increasingly popular. Kayaks made for white water sports are typically constructed from a flexible plastic skin to yield upon impact with obstacles encountered in white water conditions such as rocks, logs, etc. The hull is typically formed in a rotational molding process using a high density polyethylene plastic. A supporting internal framework is used to maintain the configuration and structural integrity of the kayak under impact forces with the water and obstacles encountered. Frame elements have been constructed from solid foam blocks such as disclosed in U.S. Pat. No. 4,681,060; and from hollow frame elements such as disclosed in U.S. Pat. No. 4,227,272. Due to the nature of the flexible plastic skin of the kayak, attachment of straps and loops to lift and pull on the kayak is a problem to which considerable attention need be given. It often becomes necessary to lift or pull the kayak under considerable force, for example, when the kayak has become lodged between obstacles either above or under the water, in white water conditions. Typically, the kayak will fill with water making it very difficult and heavy to move. Loops formed from ropes and strap material which have been threaded through openings in the kayak hull are not able to be utilized to pull a wedged kayak from the water because the skin cannot withstand the force. In many other applications, it is necessary to lift or pull the kayak under such forces as would damage the skin under most typical constructions where loops have been secured to the hull.

Accordingly, an important object of the present invention is to provide a strap channel and method for a flexible plastic skin article such as a kayak which can withstand considerable forces without damaging the flexible skin.

Another object of the invention is to provide a molded channel strap for a flexible skin kayak and the like through which a loop may be secured to the kayak that can withstand considerable forces.

Another object of the invention is a method for forming a molded strap channel as one-piece with a kayak hull during a rotational molding process whereby a loop can be secured with the strap channel that can withstand considerable forces.

SUMMARY OF THE INVENTION

The above objectives are accomplished according to the present invention by a molded strap channel and method for a flexible skin kayak and the like wherein a metallic forming member is secured to a rotational mold and a strap channel having an approximate diameter and shape of the forming member is molded into the kayak. Preferably, the forming member is a continuous arc and is secured to the mold so that the distal ends of the arcuate forming member terminate generally in a common plane or surface. According to the method, the arcuate forming member is secured to the mold, the plastic material is placed in the mold, and the rotational molding process completed. After the molding process, while the mold is still hot, the forming member is unattached from the mold so that shrinkage of the plastic hull during cooling will not distort the molded strap channel. After the molded kayak is removed from the mold, and while the plastic hull is still warm, the metal forming member is tapped from one end so that it moves outwardly from the correspondingly shaped strap channel and can be removed. In this manner, two openings are formed in a generally common plane or surface in the upper hull of the kayak which communicate through the arcuate channel depending within the hollow interior of the kayak. A rope or other strap may be inserted through the openings to form a loop by which the kayak can be moved under substantial forces.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 4 is a sectional view illustrating a molded channel strap according to the invention;

FIG. 5 is a sectional view illustrating a molded channel strap according to the invention; and FIG. 6 is a sectional view illustrating a molded channel strap formed by the rotational molding process according to the invention.

DESCRIPTION OF A PREFERRED EMBODIMENT

Referring now in more detail to the drawings, a kayak 10 having a flexible hull 12 is illustrated which includes a strap loop 14 secured through an upper hull portion 16. Kayak hull 12 is formed by rotational molding from a suitable polymeric material such as a cross-link polyethylene. A suitable cross-link polyethylene material is manufactured by the Phillips Company under the brand name Marlex ®. Any suitable rotational molding process may be utilized such as that disclosed in U.S. Pat. Nos. 4,247,279 and 3,822,890, incorporated by reference utilizing a conventional two-piece rotational mold.

Figure 1:
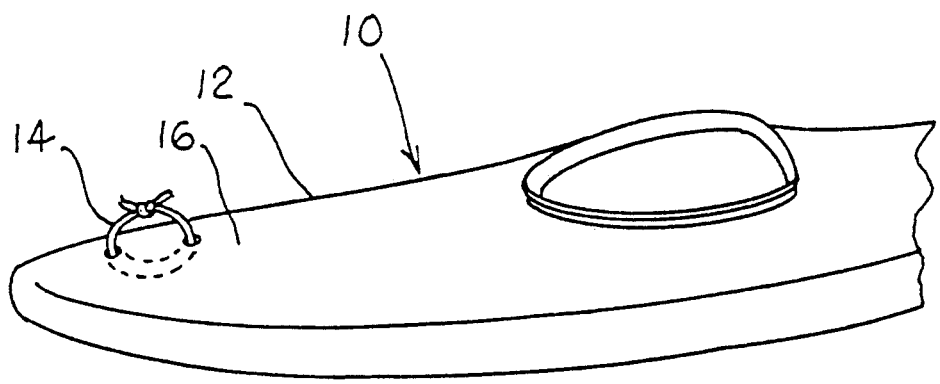
FIG. 1 is a perspective view of a kayak having a molded strap channel in accordance with the invention.
Figure 2:
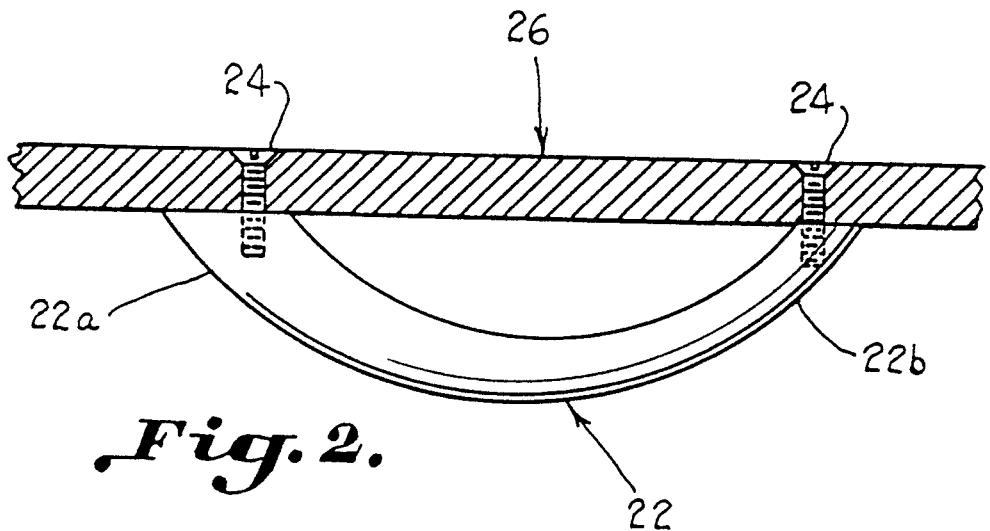
FIG. 2 is a sectional view illustrating a molded channel strap and method according to the invention wherein a forming member is secured to a rotational mold.
Figure 3:
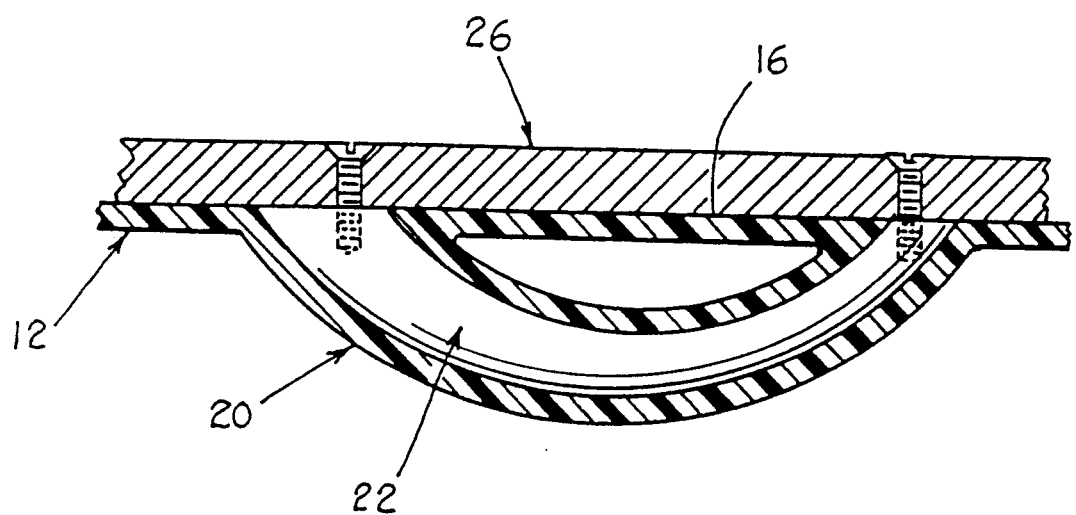
FIG. 3 is a sectional view illustrating a molded channel strap and rotational molding method according to the invention.

In accordance with the present invention, a method for molding a channel strap, designated generally as 20 will now be described by reference to FIGS. 2 through 6. In the first step of the method according to the invention, a metallic forming member 22 is secured by any suitable means, such as screws 24 to a rotational mold 26 which is typically an aluminum mold. Preferably, forming member 22 is provided in the form of an arcuate shape, as can best be seen in FIG. 2, and tapers from a first end 22a to a second end 22b. The purpose of the taper and arcuate shape will be more described fully hereafter.

After forming member 22 is secured to the top half of mold 26, the plastic material is placed in the mold in accordance with conventional rotational molding techniques and the rotational molding processes is began. During the rotational molding process, hull 12 of the kayak will be formed consisting of a thin flexible plastic skin. In addition, strap channel 20 will also be molded simultaneously. After the molding process is completed and while mold 26 is still hot, screws 24 are removed. This is because the hull of the kayak will shrink as the mold cools. By releasing forming member 22 from the mold, it will move with the hull as the hull shrinks slightly and prevent deformation of strap channel 20 that has been molded with the hull. It is important that the forming member be tapped from the molded strap channel while the hull is still hot from molding. If not, the molded strap channel will have a tendency to shrink down around the forming member, making it difficult to remove. By providing the forming member in the form of an arc with a continuous taper, it is completely released when it is tapped. The screws are removed from the molds to release the forming member when the mold is still about 400 degrees. The forming member is tapped out of the kayak hull when the hull is about 130 degrees.

Next, mold 26 is opened and the kayak is removed. Next, a punch 28 is utilized to tap the narrow end 22b of forming member 22 so that the wide end 22a is forced out of molded strap channel 20. Forming member 22 is then removed by grasping end 22a and pulling it from molded strap channel 22 (FIG. 5). Molded strap channel 20 thus formed, will have two openings 20a and 20b which open into a common surface 30 and lie generally in a common plane 32 (FIG. 6). Any suitable rope or strap material may be inserted into opening 20a or 20b and pushed through a hollow interior 20c of strap channel 20 until it is pushed through the opposite opening of the strap channel. The rope or strap may then have its ends secured to form loop 14. In this manner, a strap channel is formed to which a loop may be secured for imparting substantial forces on the flexible skin hull of the kayak. The arcuate shape of forming member 22 is necessary for removal of the forming member after rotational molding. The taper of the forming member is also an expedient to removal of the forming member after rotational member.

Thus, it can be seen that an advantageous construction for a molded strap channel can be had in accordance with the present invention for flexible skin articles such as kayaks and the like, together with an advantageous process for molding such a strap channel.

While a preferred embodiment of the invention has been described using specific terms, such description is for illustrative purposes only, and it is to be understood that changes and variations may be made without departing from the spirit or scope of the following claims.

What is claimed is:

1. A kayak constructed from a flexible plastic skin comprising:

a molded hull which includes a flexible plastic skin having an upper hull portion;

said molded hull having a hollow interior;

a strap channel molded as one-piece with said hull having a first channel opening and a second channel opening; and said first and second channel openings being formed in said upper shell portion along one substantially planar surface, with said first and second channel openings lying generally in a common plane and opening outwardly from said common plane; and said strap channel being arcuate and depending from said upper portion of said hull downwardly into said hollow interior in a manner to be spaced from said upper hull portion; so that a strap may be inserted through said first and second channel openings of said strap channel to form a continuous loop for exerting a substantial force on said kayak hull.

2. The apparatus of claim 1 wherein said molded strap channel has an arcuate shape.

3. The apparatus of claim 2 wherein said molded strap channel has a continuous taper from said first channel opening to said second channel opening.

4. The apparatus of claim 1 wherein said molded strap channel has a continuous taper from said first channel opening to said second channel opening.

5. A method of forming a continuous strap channel in a kayak constructed from a flexible plastic skin in a rotational molding process, said method comprising:

securing a forming member to a rotational kayak mold;

placing a plastic material in said mold;

subjecting said plastic material in said rotational mold to a rotational molding process wherein said plastic material is molded into a thin, flexible plastic skin in the shape of said kayak having a hollow interior, and molding a channel about said forming member contiguous with said skin, said strap channel being molded with said skin depending into said hollow interior in a manner to be spaced from said upper hull portion of said kayak;

unattaching said forming member from said mold;

opening said rotational mold and removing said kayak; and removing said forming member from said strap channel so that a continuous molded strap channel is formed as one-piece with an upper substantially shell portion with said flexible skin having a first channel opening at one point in said skin and a second channel opening at a second point in said skin where said first and second channel openings lie generally in a common plane and opening outwardly from said common plane.

6. The method of claim 5 including using a forming member having an arcuate shape.

7. The method of claim 6 including using a forming member having a continuous taper from a first channel from a first end to a second end corresponding to said first and second channel openings molded in said skin.

8. The method of claim 5 including using a forming member with a shape having a continuous taper from a first end to a second end corresponding to said first and second channel openings.

9. In a method for rotationally molding a flexible skin kayak, a method for molding a continuous strap channel as one-piece with said kayak comprising:

attaching a forming member to a rotational mold in which said kayak is molded;

placing a plastic material in said rotational mold;

subjecting said plastic material to a rotational molding process in said rotational mold so that a kayak hull is formed including a thin, plastic flexible skin defining a hollow interior and with a continuous strap channel molded as one-piece with said flexible skin corresponding to the shape of said forming member depending downwardly into said hollow interior in a manner to be spaced from said upper hull portion and having a first channel opening corresponding to a first end of said forming member and a second channel opening corresponding to a second end of said forming member;

unattaching said forming member from said mold;

removing said flexible skin hull, forming member, and molded strap channel from said mold;

removing said forming member from said strap channel so that a first continuous strap channel is provided having a first channel opening formed in an upper portion of said hull and a second channel opening formed in said upper portion of said hull; and using a forming member having a continuous taper from a first end to a second end corresponding to said first and second channel openings molded in said skin.

10. The method of claim 9 including forming said first and second channel openings in a common surface of said upper portion of said hull and generally in a common plane.

11. The method of claim 10 including using a forming member having an arcuate shape.

12. The method of claim 9 including using a forming member with a shape having a continuous taper from a first end to a second end corresponding to said first and second channel openings.

13. The method of claim 9 including unattaching said forming member from said mold when said mold is still hot, and prior to any significant shrinkage of said kayak hull.

14. The method of claim 9 wherein said forming member is removed from said strap channel before said molded kayak hull has cooled to ambient.

* * * * *